US009219951B2

(12) United States Patent
Sharifi

(10) Patent No.: US 9,219,951 B2
(45) Date of Patent: Dec. 22, 2015

(54) MOBILE TV SYSTEM ARCHITECTURE FOR MOBILE TERMINALS

(75) Inventor: Kamran Sharifi, Toronto (CA)

(73) Assignee: ANALOG DEVICES, INC., Norwood, MA (US)

( * ) Notice: Subject to any disclaimer, the term of this patent is extended or adjusted under 35 U.S.C. 154(b) by 1590 days.

(21) Appl. No.: 12/137,251

(22) Filed: Jun. 11, 2008

(65) Prior Publication Data

US 2009/0100475 A1 Apr. 16, 2009

Related U.S. Application Data

(60) Provisional application No. 60/998,753, filed on Oct. 12, 2007.

(51) Int. Cl.
H04N 21/472 (2011.01)
H04N 5/44 (2011.01)
H04N 21/658 (2011.01)
(Continued)

(52) U.S. Cl.
CPC ........ *H04N 21/6581* (2013.01); *H04L 65/4076* (2013.01); *H04L 65/4084* (2013.01); *H04N 5/44* (2013.01); *H04N 21/235* (2013.01); *H04N 21/41407* (2013.01); *H04N 21/434* (2013.01); *H04N 21/435* (2013.01);
(Continued)

(58) Field of Classification Search
CPC .. H04N 21/64315; H04N 21/472; H04N 5/44
USPC ........... 725/62; 455/3.01, 3.04, 3.06; 348/522
See application file for complete search history.

(56) References Cited

U.S. PATENT DOCUMENTS 5,592,471 A * 1/1997 Briskman ...................... 455/506
6,941,340 B2 * 9/2005 Kim et al. ..................... 709/203
(Continued)

FOREIGN PATENT DOCUMENTS

EP 1603263 12/2005
WO WO 2005/045603 5/2005
WO WO 2005045603 A2 * 5/2005

OTHER PUBLICATIONS

"Digital Video Broadcasting (DVB); Transmission System for Handheld Terminals (DVB-H)," *European Broadcasting Union*, ETSI EN 302 304 V1.1.1., pp. 1-13 (2004).
(Continued)

*Primary Examiner* — Benjamin R Bruckart
*Assistant Examiner* — Jason Thomas
(74) *Attorney, Agent, or Firm* — Kenyon & Kenyon LLP

(57) ABSTRACT

A mobile TV system architecture for a mobile terminal that reduces the processing required by the main processor during reception of digital broadcasts such as DVB-H. The mobile terminal architecture includes a main processor system and a mobile TV receiver device. The mobile TV receiver device includes units for SI/PSI processing, IP processing and decryption engine. The SI/PSI (service information/program specific information) processing unit receives non-protected transport stream (TS) packets and extracts SI/PSI tables which can be stored in memory local to the receiver device. The IP processing unit receives decrypted error-corrected protected packets containing multimedia content. The receiver device may include an HTTP server for communicating with a browser application running on the main processor system. The browser application presents multimedia content, received via HTTP, corresponding to a URL entered or selected by a user.

27 Claims, 5 Drawing Sheets

(51) Int. Cl.
H04N 21/235 (2011.01)
H04N 21/414 (2011.01)
H04N 21/434 (2011.01)
H04N 21/435 (2011.01)
H04N 21/482 (2011.01)
H04N 21/643 (2011.01)
H04L 29/06 (2006.01)

(52) U.S. Cl.
CPC ........ *H04N 21/4345* (2013.01); *H04N 21/472* (2013.01); *H04N 21/482* (2013.01); *H04N 21/64315* (2013.01)

(56) References Cited

U.S. PATENT DOCUMENTS

| | | | | |
|---|---|---|---|---|
| 2002/0129375 | A1* | 9/2002 | Kim et al. | 725/100 |
| 2002/0152311 | A1* | 10/2002 | Veltman et al. | 709/227 |
| 2003/0229900 | A1* | 12/2003 | Reisman | 725/87 |
| 2006/0018470 | A1* | 1/2006 | Paila et al. | 380/223 |
| 2007/0050820 | A1 | 3/2007 | Saarikivi et al. | |
| 2008/0092192 | A1* | 4/2008 | Rofougaran | 725/100 |
| 2009/0031352 | A1* | 1/2009 | Ho et al. | 725/40 |
| 2011/0099487 | A1* | 4/2011 | Pyhalammi et al. | 715/762 |

OTHER PUBLICATIONS

"Satellite Services to Handhelds—Mobile Digital TV in S-Band," DVB-SH, *DVB Project Office, DVB Fact Sheet* (2007), 2 pages.

"Internet Protocol Datacast—Complete Specifications for the Delivery of Mobile TV Services to Handhelds," *DV3-IPDC, DVB Fact Sheet* (2007), 2 pages.

"Broadcasting to Handhelds—The Global Technology Standard for Mobile Television", *DV3-H, DVB Fact Sheet* (2007), 2 pages.

Faria et al., "DVB-H: Digital Broadcast Services to Handheld Devices," *IEEE*, 94:1, pp. 194-209 (2006).

International Search Report and Written Opinion mailed May 29, 2009 from PCT Application PCT/US2008/011505.

Updated International Search Report and Written Opinion mailed Jul. 16, 2009 from PCT Application PCT/US2008/011505.

* cited by examiner

MOBILE TV SYSTEM ARCHITECTURE FOR MOBILE TERMINALS

CROSS-REFERENCE TO RELATED APPLICATION

The present application claims the benefit, under 35 U.S.C. §119(e), of U.S. Provisional Application Ser. No. 60/998,753, filed Oct. 12, 2007, entitled "Mobile TV System Partitioning For Mobile/Portable Terminal Devices," which application is hereby incorporated herein by reference in its entirety.

FIELD OF INVENTION

This invention relates to mobile wireless terminals and, more particularly, to a system architecture that facilitates integration of mobile TV service into a mobile wireless terminal.

BACKGROUND

For some consumers, it is desirable to "stay connected" at all times. Current mobile phones support some form of non-voice connectivity such as text messaging, allowing users to subscribe to various information services. These services provide periodic content as it becomes available or on demand from the user. Many mobile phones now support some form of Internet browsing, email access, downloading, and other forms of information transfer.

Standards are currently being established for digital TV broadcasts to a variety of wireless mobile terminals, and the availability of such services is expected to increase in the coming years.

Mobile terminals can take the form of a mobile phone, a personal digital assistant (PDA), a portable media platform (PMP), or any similar product that is capable of storing, processing, playing-back, and communicating digital content wirelessly.

FIG. 1 is a block diagram of a mobile terminal 100P capable of receiving TV signals. Mobile terminal 100P includes a mobile TV receiver 200P and a main processor system 300P. Many mobile terminals include additional functions and interfaces. For example, a mobile phone may include a mobile phone front-end receiver module that allows connectivity to a cellular network such as a GSM, EDGE, or 3G network, a display, a keyboard, headphones, speakers, microphones, a power management system, a camera, an audio/video/image codec and player, and the like.

In the main processor system 300P, the functions are divided into four main operational blocks, including, a cellular subsystem 302, an A/V subsystem 304, a host processor and memory subsystem 306, and a human interface 308. Other interfaces such as WLAN, Bluetooth, GPS, HDMI and the like, not shown in FIG. 1 may also be present.

The mobile TV receiver 200P includes a tuner 202, an analog-to-digital converter (ADC) 204, a demodulator processor and memory 206, and an antenna 208. Radio frequency (RF) communications are received through the antenna 208. The RF signal carries the modulated digital broadcast signal that includes a digital TV signal in addition to other types of broadcast data. The RF signal band, digital modulation scheme, signal bandwidth, and error correction method are specific to the standard utilized by the system. Signal bands between VHF and L band are used, with some systems using higher frequencies. The digital modulation schemes may include QPSK, DQPSK, 16-QAM, 64-QAM and the like. The channel bandwidth to carry TV signals is typically 1.5, 5, 6, 7, or 8 MHz, although other bandwidths are possible. Error correction methods such as convolutional, Reed-Solomon, and Turbo codes may be used to correct multi-byte data packets.

The mobile TV receiver 200P handles RF signal tuning and reception, analog-to-digital conversion, and signal demodulation, and provides digital data to the main processor system 300P for further processing. Cost, size, and power considerations usually demand that a serial interface 110P be used for communication between the receiver and the main processor system. Once the digital data has reached the main processor system 300P, additional processing is performed. Additional processing performed by the main processor system 300P includes error correction, decryption, decoding, play-back and the like.

Like conventional television, mobile TV is a broadcast system, so data flow is primarily from the mobile TV receiver 200P to the main processor system 300P. Control information is sent from the main processor system 300P to the mobile TV receiver 200P to control receiver operation.

One of the standards for mobile TV is DVB-H, or Digital Video Broadcasting-Handheld. DVB-H is an extension of DVB (Digital Video Broadcasting) that addresses the two main issues of broadcasting to a mobile user: power consumption of the terminal and the Doppler Effect—since users may be traveling at relatively high speeds (e.g., in a car or train).

To reduce power consumption, DVB-H utilizes a slicing scheme in which data is sent and received during pre-defined and limited time slots. This allows the receiver to partially shut down outside of the active time slots.

Improved reception quality is achieved by extensive error coding and error correction schemes.

In DVB-H, broadcasts data is sent in the form of fixed size (188 bytes) MPEG-2 (Motion Picture Experts Group) transport stream (TS) packets. FIG. 2 shows the structure of an MPEG-2 TS packet 400P which includes a header 410, a packet identifier (PID) 420, and a payload 430. Depending on the contents of payload 430, packets may be protected packets 432 or non-protected packets 434.

The payload of non-protected packets 434 carries tables of information about the services (Service Information, SI) and programs (Program Specific Information, PSI) that are being broadcast. SI and PSI tables are a part of the broadcast service delivery and are required to navigate through different types of information available in each MPEG-2 TS packet. They are used to decode the selected audio, video, picture, and/or other digital content.

The payload of protected packets 432 carries internet protocol (IP) datagrams, i.e., IP packets. The IP packets contain audio, video, image and graphics data related to each program. Additionally, the IP packets can deliver other types of information such as an electronic service guide (ESG), data files, news, traffic data, financial market data, and graphical newspapers, or any other type of multimedia content. Here and throughout, the phrase "multimedia content" refers to any type of content that may be broadcast to a mobile terminal. Mobile terminals supporting Internet Group Management Protocol (IGMP) additionally may receive content associated with groups to which the mobile terminal has privileges.

FIG. 3 represents a conventional architecture for mobile terminal 100P. The mobile TV receiver 200P is partitioned into a physical layer 210 and a data link layer 220.

In the physical layer 210, the RF tuner may be tuned to a mobile TV channel which is demodulated and converted to a digital signal. The digital signal is initially in the form of DVB symbols 232 which are then converted to MPEG-2 TS packets 234 by DVB-T (Digital Video Broadcasting-Terrestrial) unit 214.

In the data link layer 220, the MPEG-2 TS packets are sorted into protected packets 236 and non-protected packets 238 by MPEG-2 TS unit 222. MPE-FEC (multiprotocol encapsulation-forward error correction) is performed on the protected packets to improve carrier-to-noise ratio (C/N) and Doppler performance in MPE-FEC unit 224. The IP packets 112 are extracted and delivered to the IP processing unit 312 in the main processor system 300P. IP processing unit 312 identifies the IP addresses of the IP packets and filters the packets based on their destination addresses.

Non-protected packets 238 do not receive MPE-FEC decoding and are passed by Non-MPE-FEC unit 226 as TS packets 114 to the SI/PSI processing unit 314 in the main processor system 300P. The SI/PSI tables are extracted from the TS packets by SI/PSI processing unit 314.

The IP processing unit 312 and SI/PSI processing unit 314 residing on the main processor system 300P perform computationally intense tasks. This places a burden on the main processor system.

SUMMARY

A system architecture for a mobile terminal is disclosed that facilitates the integration of mobile TV service into a mobile terminal system.

In one aspect, embodiments relate to a mobile terminal comprising a host device, a receiver device, and an interface. The host device has a media player adapted to receive a multimedia stream and present a multimedia presentation. The receiver device is connected to the host device and comprises a receiver front end and processing unit. The receiver front end has an antenna and a receiver front end output. The receiver front end is adapted to receive a radio frequency (RF) signal via the antenna and output a stream of packets from the receiver front end output. The processing unit has a processor output. The processing unit is adapted to receive internet protocol (IP) packets derived from packets in the stream of packets, identify IP packets corresponding to the multimedia stream, and output the multimedia stream from the processor output. The interface is adapted to connect the host device and the receiver device.

In another aspect, embodiments relate to a method of operating a mobile terminal. The mobile terminal comprises a host device and a receiver device. The receiver device is initially configured to receive packets arriving in a first time slot. The method comprises transmitting from the host device to the receiver device a multimedia content selection, identifying an address corresponding to the multimedia content selection, looking up a packet identifier in a table stored on the receiver device, the packet identifier corresponding to the address, reconfiguring the receiver to a second time slot, and transmitting multimedia content decrypted with a decryption key from the receiver device to the host device.

In another aspect, embodiments relate to a method of processing a broadcast signal by a receiver device for transmission to a host device. The method comprises receiving a RF broadcast signal at the receiver device, converting, in the receiver device, the RF broadcast signal into a baseband signal comprising protected and non-protected packets, sorting protected and non-protected packets in the receiver device, extracting service information and program specific information (SI/PSI) tables from non-protected packets and storing the SI/PSI tables to memory in the receiver device, error correcting protected packets, in the receiver device, wherein the error correcting produces internet protocol (IP) packets, determining, in the receiver device, an IP packet type based on a destination address for each IP packet, and transmitting IP packets having an audio/video (A/V) packet type from the receiver device to the host device, over a serial interface, for playback.

In yet another aspect, embodiments relate to a wireless communications device. The wireless communication device comprises a host processor and a receiver block. The host processor includes a media player and a user interface that permits a user to select a TV channel. The receiver block is connected to the host processor and comprises a receiver front end and a processing unit. The receiver front end is configured to receive an RF signal containing a stream of packets. The processing unit is configured to process at least a portion of the received stream of packets and, in response to a request from the host processor for the user selected TV channel, to provide packets corresponding to the selected TV channel to the host processor for playback by the media player.

BRIEF DESCRIPTION OF DRAWINGS

The invention and embodiments thereof will be better understood when the following detailed description is read in conjunction with the accompanying drawing figures. In the figures, elements are not necessarily drawn to scale. In general, like elements appearing in multiple figures are identified by a like reference designation. In the drawings.

DETAILED DESCRIPTION

Mobile terminals are very complex devices that offer a wide variety of functions. Different terminals offer different features, hardware/software capabilities, user interfaces, connection technologies, and available applications for the end user. Because of the diversity, variety, and complexity of mobile terminals, integrating TV and/or other broadcast services into these terminals may be a complicated task.

A system architecture is disclosed that facilitates the integration of the mobile TV service into a mobile terminal system by providing standard-based, well-understood, widely used and ubiquitous networking and programming interfaces. Introduction of such an interface will enable the mobile TV service to be added to the main processor software as a plug-in module, thus reducing the complexity of software integration tasks. The disclosed architecture also reduces the MIPS (Million Instructions Per Second) loading, memory, and timing requirements for the mobile terminal's main processor system. This can lead to an increase in efficiency and throughput of the interface between the mobile TV receiver module and the mobile terminal main processor system.

For convenience, Table 1 lists some of the terms used in this specification.

TABLE 1

Table of Terms

| Acronym | Meaning |
|---|---|
| A/V | Audio/Video |
| ADC | Analog-to-Digital Converter |
| AES | Advanced Encryption Standard |
| API | Application Programming Interface |
| ARQ | Automatic Repeat-Request |
| C/N | Carrier-to-Noise Ratio |
| DVB | Digital Video Broadcasting |
| DVB-H | Digital Video Broadcasting-Handheld |
| DVB-T | Digital Video Broadcasting-Terrestrial |
| ESG | Electronic Service Guide |
| FEC | Forward Error Correction |
| FLUTE | Filed Delivery over Unidirectional Transport |
| GUI | Graphical User Interface |
| HTML | HyperText Markup Language |
| IGMP | Internet Group Management Protocol |
| IP | Internet Protocol |
| LCD | Liquid Crystal Display |
| MFN | Multi-Frequency Networks |
| MIPS | Million Instructions Per Second |
| MPE-FEC | Multiprotocol Encapsulation-Forward Error Correction |
| MPEG | Motion Picture Experts Group |
| PID | Packet Identifier |
| PSI | Program Specific Information |
| RF | Radio Frequency |
| RTP | Real-Time Transport Protocol |
| SDP | Session Description Protocol |
| SI | Service Information |
| SPP | Service Purchase and Protection |
| TS | Transport Stream |
| UDP | User Datagram Protocol |
| URL | Uniform Resource Locator |
| VDP | Variable Data Printing |
| XML | Extensible Markup Language |

Description of an Embodiment of Mobile Terminal 100

Figure 4:
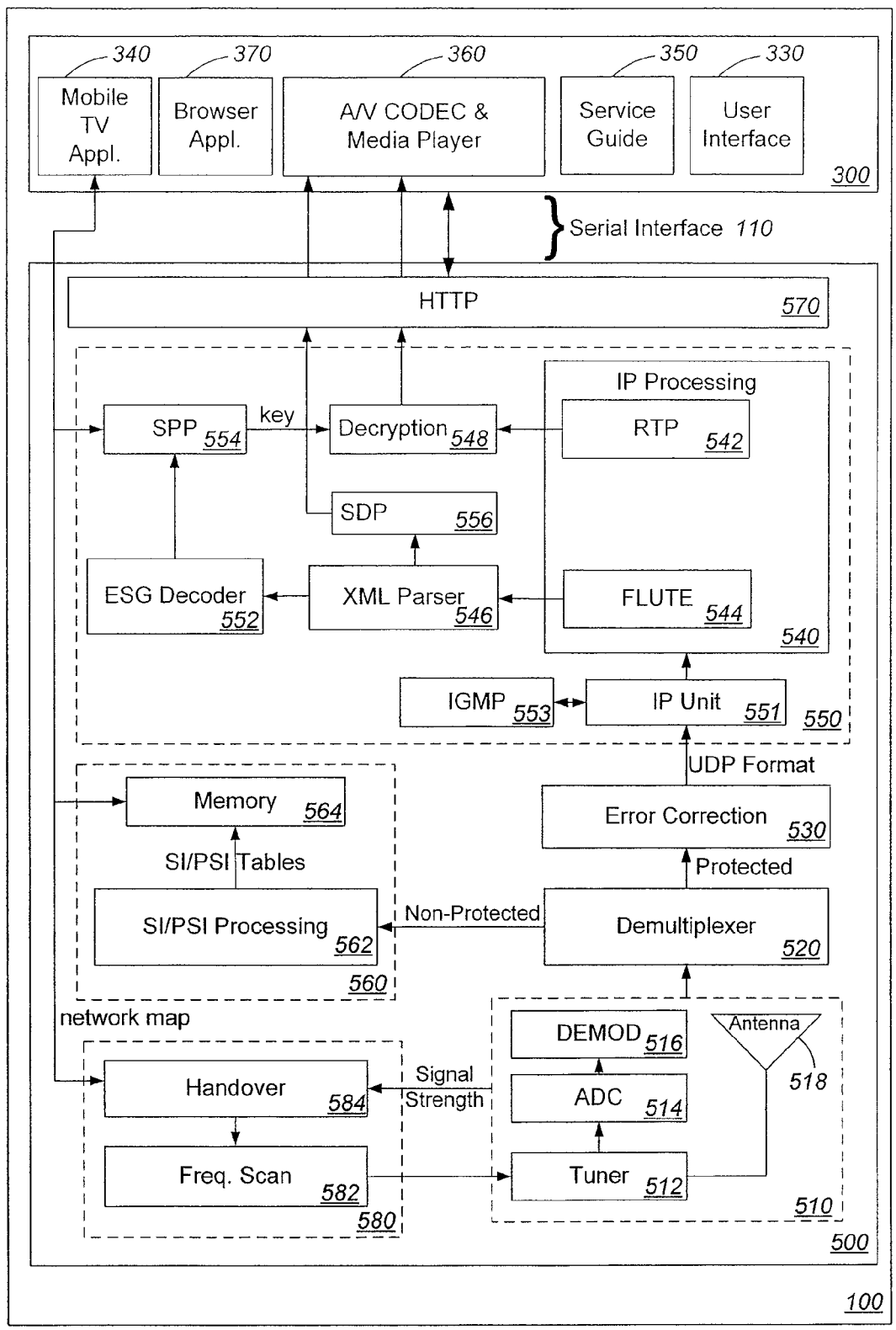
FIG. 4 is a block diagram of the mobile terminal architecture according to some embodiments.

FIG. 4 is a block diagram of a mobile terminal 100 according to some embodiments of the invention. The mobile terminal 100 is functionally partitioned into a Host/Application main processor system 300 and a mobile TV receiver device 500.

Communication between the mobile TV receiver device 500 and the main processor system 300 may be performed over an interface 110. While interface 110 is typically a serial interface, any other type of interface for communicating data between the main processor system 300 and the mobile TV receiver device 500 may be used, such as a parallel interface.

In some embodiments, main processor system 300 is implemented as one or more integrated circuits, such as a digital signal processor, and mobile TV receiver device 500 is implemented as a separate integrated circuit and/or other hardware. In some embodiments, mobile TV receiver device 500 and main processor system 300 may be combined onto the same integrated circuit.

Main Processor System 300

Figure 1:
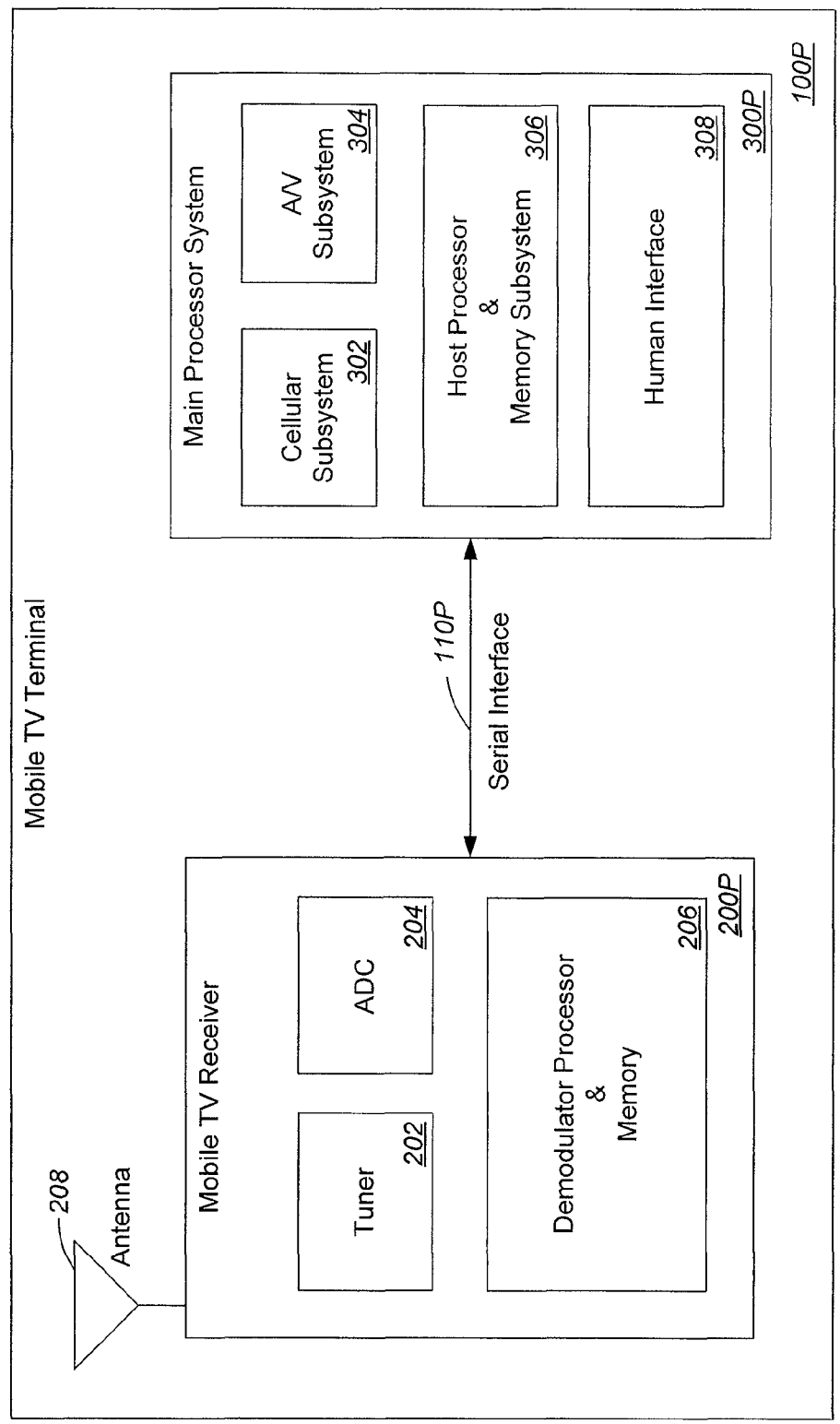
FIG. 1 is a block diagram of a mobile terminal.

Main processor system 300 is adapted to execute an A/V CODEC and media player 360, a user interface 330, a mobile TV application 340, a service guide 350, a browser application 370, and may have other components not shown. The A/V codec and media player 360 may decode the media stream (that is to decompress the compressed media stream) and play back the video and audio contents. For example, the video and audio contents may be played back over an LCD display and a speaker system, respectively. The user interface 330 may receive input signals from the user and transmit the control signals from such input devices as keyboard, touch sensor screen, buttons, stylus or similar devices to the main processor. The mobile TV application 340 may be a software that allows the user to select a specific TV channel for viewing. It may also verify that the user has the right privileges for viewing a particular channel. The service guide 350 may collect all the information about available channels and their schedule in a tabular form. The browser application 370 may provide the familiar browser graphical user interface on a display screen. It also provides the graphical environment to display the video component of the TV, or the service guide. In some embodiments, the main processor system 300 may be made of identical or similar hardware as the main processor system 300P (FIG. 1) of the prior art.

The main processor system 300 may present the multimedia content through a stand-alone program or through a browser application similar to Microsoft Internet Explorer, Mozilla Firefox, or any other embedded browser application software. The browser application may provide a familiar look and feel to users.

Receiver Device 500

The receiver device 500 digitizes received RF communications and performs network layer and additional processing prior to sending multimedia content to the main processor system 300. The receiver device 500 may contain a receiver front end 510, a demultiplexer 520, an error correction unit 530, a protected packet processing unit 550 containing an IP processing unit 540, a non-protected packet processing unit 560, an HTTP server 570, and a receiver controller 580. Each of these units is described below.

Receiver Front End 510

The receiver front end 510 provides the functionality of a receiver unit with a digital signal output. The receiver front end 510 may be adapted to receive signals of any RF band appropriate for transmission of multimedia content. In some embodiments, tuner 512 selects the desired signal band, and suppresses unwanted signals. RF communications may be received by an antenna 518.

The RF signal received by receiver front end 510 may be digitized and demodulated. Digitization and demodulation may be performed using hardware, software, or any other suitable means. In some embodiments the RF signal is converted to a digital signal by an analog-to-digital converter (ADC) 514, and may then be demodulated by demodulator 516.

The receiver front end 510 outputs a digital signal containing received information to demultiplexer 520. In embodiments supporting DVB-H broadcasts, the signal output to demultiplexer 520 may be in the form of MPEG-2 TS packets. In some embodiments, a signal strength output measurement is provided to receiver controller 580.

Demultiplexer 520

Demultiplexer 520 distributes portions of the digital signal received from receiver front end 510 to various receiver components, such as protected packet processing unit 550 and non-protected packet processing unit 560.

In some embodiments, the digital signal is received as a series of packets. The demultiplexer 520 sorts the packets based on packet type. In embodiments for receiving DVB-H broadcasts, packets may be sorted into protected packets and non-protected packets.

Error Correction Unit 530

Packets requiring error correction (e.g., protected packets, MPEG-2 TS protected packets, MPE-FEC packets) are sent to the error correction unit 530 by the demultiplexer 520. Error correction unit 530 may perform any suitable error correction method. In embodiments where the receiver device does not send signals back to the transmission station, automatic repeat-request (ARQ) is not practical, and forward error correction (FEC) may be used. In embodiments for receiving a DVB-H broadcast, multiprotocol encapsulation-forward error correction (MPE-FEC) may be performed on protected packets.

Error corrected packets are output from the error correction unit 530 to the protected packet processing unit 550. In embodiments for receiving a DVB-H broadcasts, error correction unit 530 outputs user datagram protocol (UDP) formatted IP packets to the protected packet processing unit 550.

Protected Packet Processing Unit 550

Figure 2:
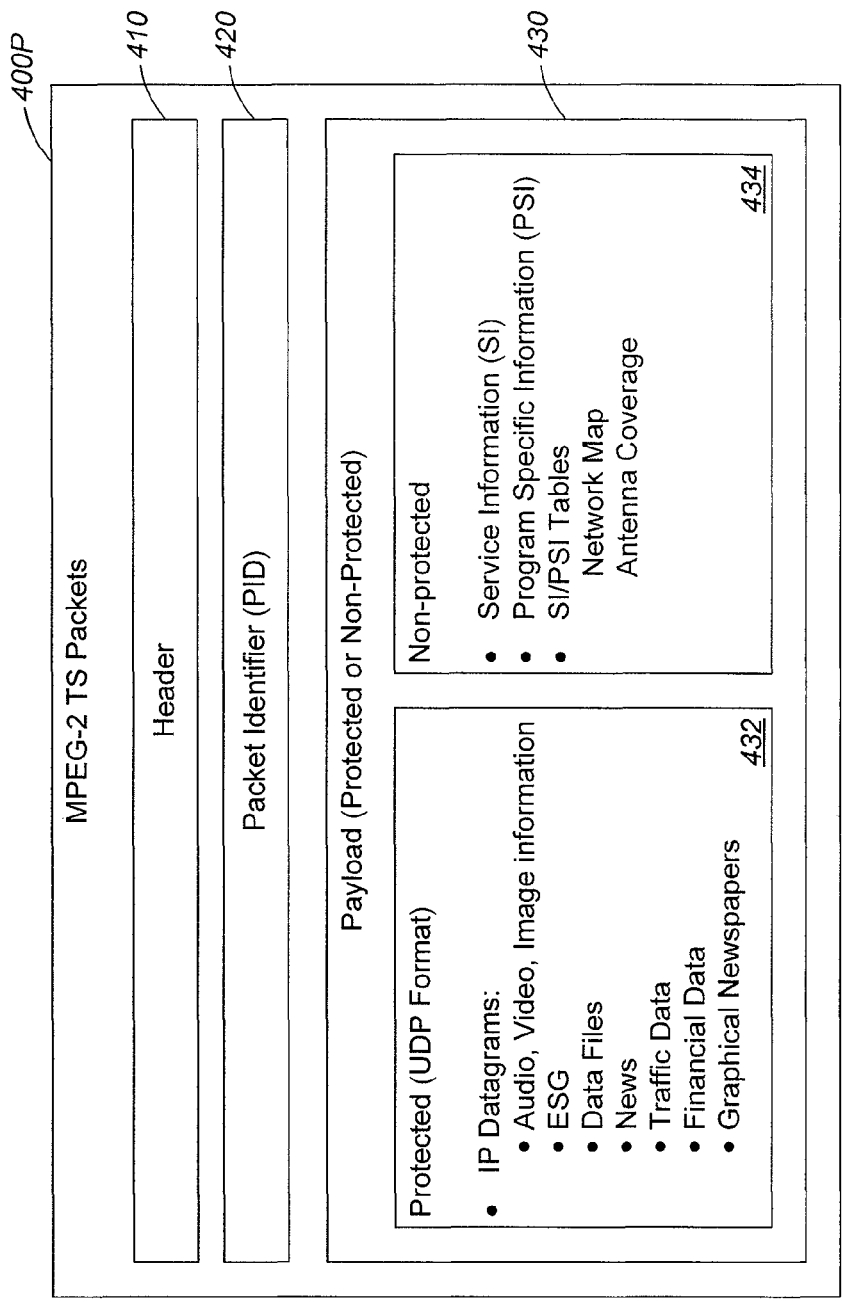
FIG. 2 is a block diagram of the structure of an MPEG-2 TS packet.
Figure 3:
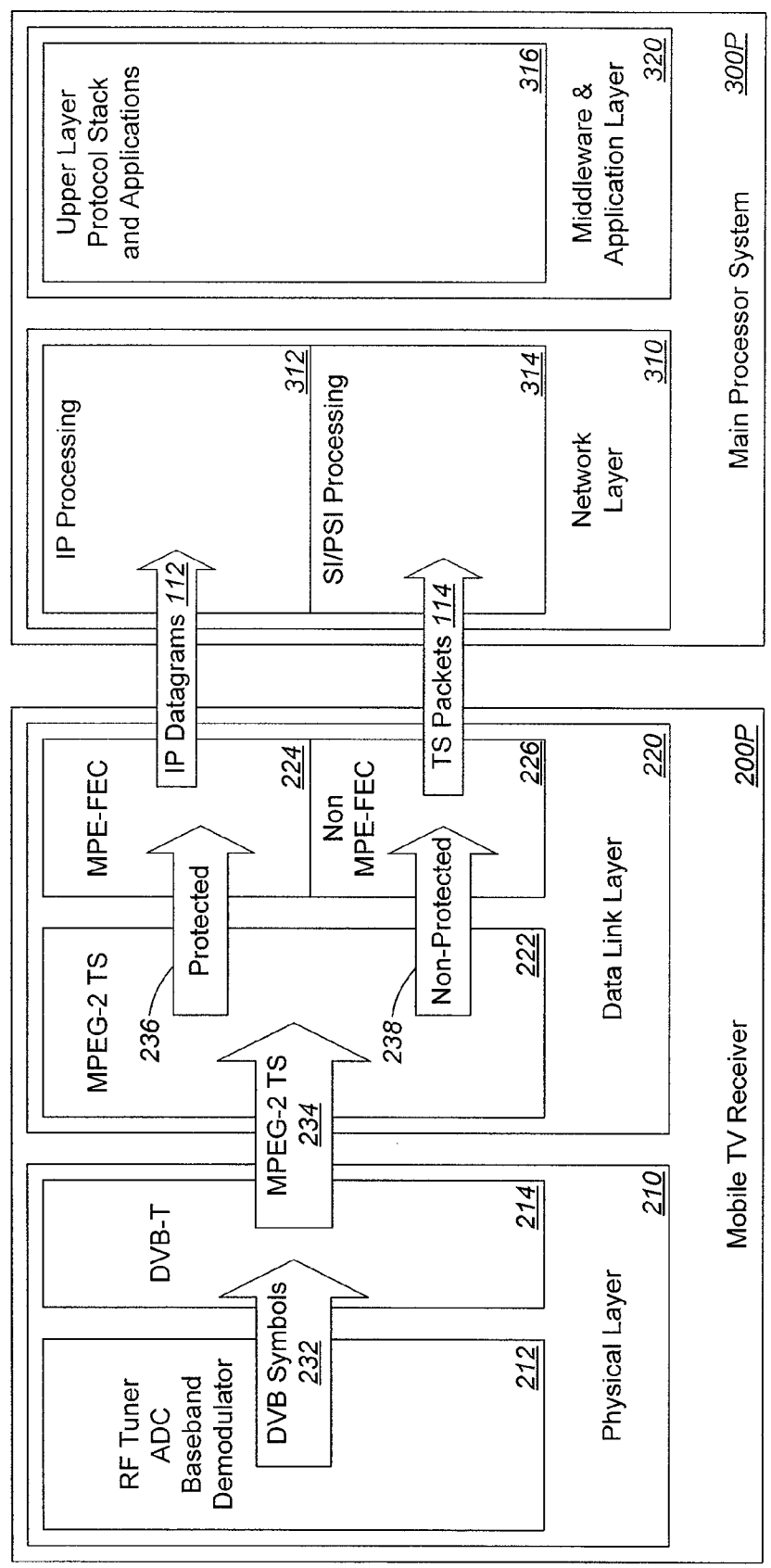
FIG. 3 is a block diagram of a conventional architecture of a mobile terminal.

The protected packet processing unit 550 extracts the payload of each packet received from the error correction unit 530 (e.g., protected packets 432, FIG. 2). In some embodiments, the error corrected IP packets are output from the error correction unit 530 in the UDP format to the IP unit 551 of the protected packet processing unit 550. The IP packet payload and delivery information may be extracted by IP unit 551.

In some embodiments supporting IGMP, IP unit 551 additionally receives information from IGMP unit 553 for identifying packets pertaining to broadcast data directed to a messaging group with which mobile terminal 100 is associated.

The payloads extracted by IP unit 551 are directed to the IP processing unit 540. The content of each payload is determined by the IP processing unit 540. Payloads may include multimedia content (e.g., A/V packets), information needed for decryption (e.g., electronic service guide files), media session information (e.g., session description protocol files), and any other information necessary for presenting multimedia content. IP processing unit 540 identifies and directs payloads to the file delivery over unidirectional transport (FLUTE) module 544 or the real-time transport protocol (RTP) module 542 based on their packet type as determined by a destination address and UDP port number.

Packet types relevant to DVB-H broadcasts include electronic service guide (ESG) files, session description protocol (SDP) files, and A/V packets. ESG files carry information on how the broadcast A/V data is encrypted. Packets that contain ESG files are delivered to an ESG decoder 552 through FLUTE module 544 and an XML (extensible markup language) parser 546 for extraction of relevant information.

The FLUTE protocol helps in obtaining an error-free delivery of a file over a unidirectional broadcast channel. FLUTE module 544 may be part of IP processing unit 540 and is used primarily in dealing with FLUTE protocol packets containing ESG files and SDP files.

The ESG decoder 552 decrypts the ESG information using standards-based decryption algorithms such as 128-bit AES (advanced encryption standard). The operation that controls the decryption process and manages the decryption keys relies on the extracted information from the ESG files and is called a service purchase and protection (SPP) helper process unit 554. The SPP helper process unit 554 may extract the updated decryption keys from the ESG data and provide the decryption keys to the decryption engine 548. The decryption engine uses the decryption keys to decrypt the A/V data before sending it to the main processor system 300.

Session description protocol (SDP) module 556 provides a standard representation of the information required to initiate a streaming media session, such as viewing a broadcast digital TV channel. The standard representation may include information such as bit rate, type of audio/video compression, transport addresses, and other types of media details. Packets that contain SDP files are recognized by their IP destination address and UDP port number and are delivered to the host media player 360 through FLUTE module 544 and XML parser 546. When the SDP file is extracted from FLUTE data, it can be presented to the A/V CODEC and media player 360 of the main processor system 300.

A/V packets contain actual compressed audio/video tracks for the requested channel or program and are sent from the IP processing unit 540 via the RTP unit 542 to the media player 360 running on the main processor system 300 via RTP protocols. In some embodiments where decryption is used, the A/V packets are decrypted by the decryption engine 548 which receives the necessary decryption keys from SPP helper process unit 554.

HTTP Server 570

In some embodiments, the multimedia content and session information are sent to the main processor system 300 using HTTP server 570. The HTTP server 570 transmits multimedia content to the main processor system 300 using hypertext transfer protocol (HTTP). The multimedia content may be displayed through a browser application 370 running on the main processor system 300.

The HTTP server 570 may also receive information from the main processor system 300. For example, in some embodiments a user may select a TV channel for viewing through a web browser application. The request may be sent to the HTTP server 570 of device 500 via HTTP, in the form of a uniform resource locator (URL), over the serial interface 110. In such configuration, the list of available programs is presented graphically in the window of the browser application 370, and a scroll bar in the browser may allow the user to scroll onto the TV channel to be watched. In some embodiments, simply clicking on the bar (or tapping the screen if a touch sensor is used) will enable the viewing of the TV channel of interest.

Non-Protected Processing Unit 560

Packets not requiring error correction (e.g., non-protected packets) by error correction unit 530 are directed to the non-protected processing unit 560 by the demultiplexer 520. The non-protected processing unit 560 may extract and store tables containing information needed to decode the multimedia content. Also extracted in some embodiments is network map information, which provides details on the signal coverage for the surrounding geographic space. In embodiments supporting DVB-H broadcasts, the non-protected processing unit 560 receives the non-protected packets from the demultiplexer 520. The extracted tables are SI/PSI (Service Information/Program Specific Information) tables which are stored in embedded memory 564.

The non-protected packet processing unit 560 includes the SI/PSI processing unit 562 and memory 564. The SI/PSI processing unit 562 navigates through the received TS packets, extracts the relevant SI/PSI tables and stores them in memory 564. The SI/PSI tables may contain information about the available frequency bands, networks, channels, and programs. The tables also include the IP addresses of those IP packets containing compressed audio/video data for broadcast programs and packets containing ESG.

Receiver Controller 580

The receiver controller 580 may control the receiver front end 510. At start up, the receiver controller may configure the receiver front end and instruct it to scan for available content bands. Signal strength measurements provided from the receiver front end 510 may be used to determine if the receiver should be reconfigured to receive content from a different transmitter.

In embodiments where handover from one transmitter to another requires a change in tuner configuration, the receiver controller 580 enables the seamless reconfiguration of the receiver front end without perceptible interruption of content.

Receiver controller 580 may include a frequency scan unit 582 and a handover unit 584. In Multi-Frequency Networks (MFNs), a handover takes place when a mobile terminal 100 leaves a coverage area of a first cell and enters a coverage area of a second cell. In MFNs, transmitters of neighboring cells operate at different frequencies. In some embodiments, handover is managed by the mobile TV receiver device 500 without involvement of the main processor system 300. In DVB-H systems, handover may involve a change in frequency and/or change in the transport stream that carries the desired signal. The time slicing feature of DVB-H allows for the seamless handover from the first cell to the second without interruption of service.

Radio signal strength may be monitored by receiver controller 580. The SI/PSI tables stored in memory 564 contain network map information and how the area is covered by multiple antennas. This information is provided to handover unit 584. When the signal strength of the tuned frequency band decreases below a threshold, the handover unit may cause the tuner 512, via frequency scan unit 582, to tune to a different frequency band based on the network map data.

In some embodiments, the broadcasts from adjacent cells may be monitored during the off-time in DVB-H systems. The signal strength for the neighboring cells is measured. The handover unit 584 may cause the frequency scan unit 582 to tune to the cell of the same network with the strongest signal. By synchronizing to the new frequency, the transport stream of the same IP stream is found in the new cell and the relevant content is sent to the main processor system 300 without interruption of service.

The frequency scan unit 582 may control tuner 512. If no frequency band is preset, frequency scan unit 582 starts a scanning process by configuring tuner 512 for the proper mode and registers all the available bands. This list is stored in memory 564 and is available to the main processor system 300 upon invocation of an appropriate API (application programming interface) such as mobile TV application 340. In some embodiments, a GUI (graphical user interface) may present this list to the user. A graphical presentation may also be made by the browser application 370.

Method of Operating a Mobile Terminal 100

Figure 5:
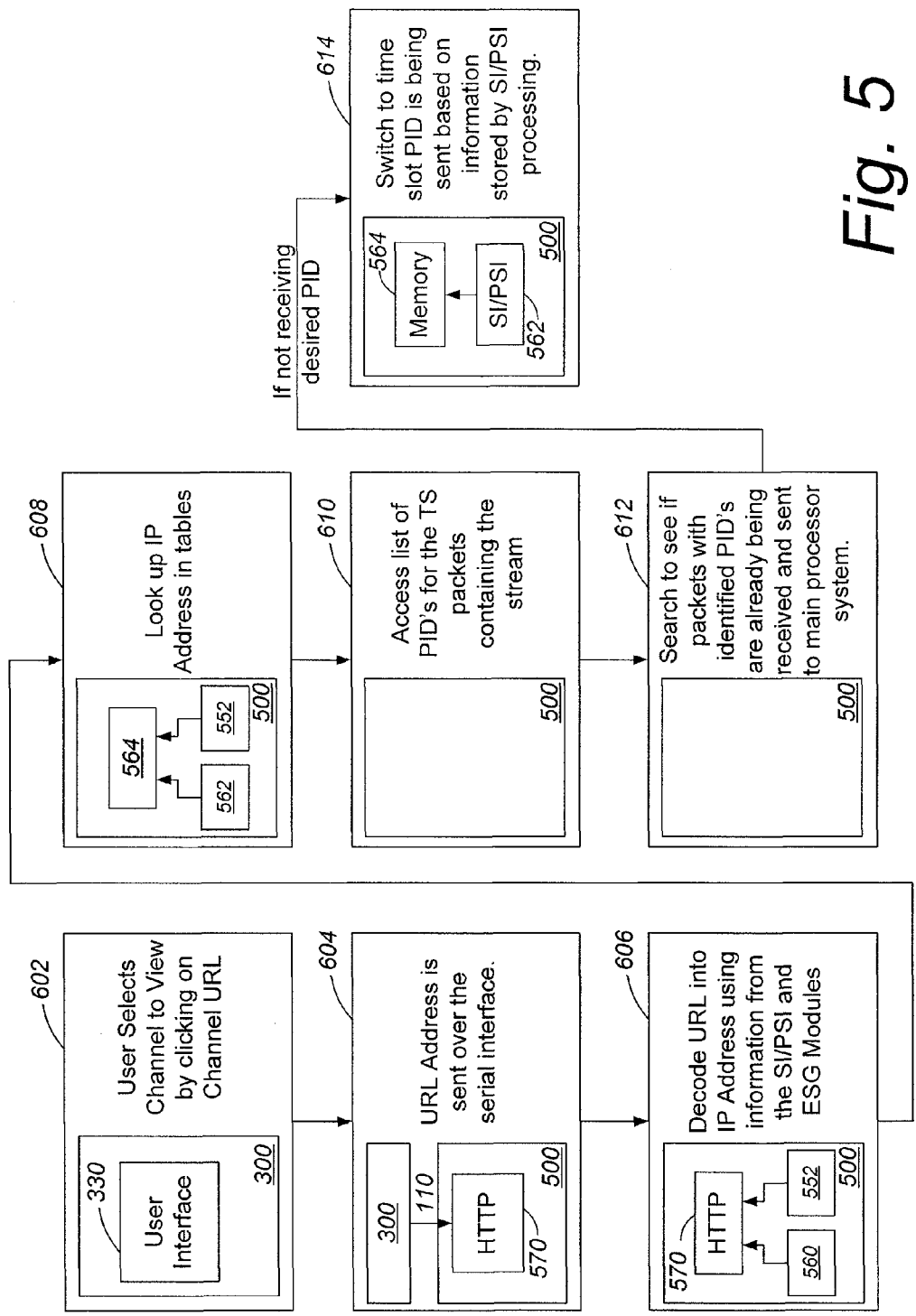
FIG. 5 is a flowchart for selecting and connecting to a mobile TV station according to some embodiments.

In some embodiments, a user may select a channel for viewing from a list of channels provided by user interface 330. An embodiment of a selection process is shown in FIG. 5. The list of channels may be stored in the main processor system 300 and is derived from the ESG and SI/PSI data processed by the mobile TV receiver device 500. In embodiments where the main processor system 300 is running a browser application, the user directly or indirectly selects the URL of the desired channel (step 602). The URL, which may reference the TV station or channel, e.g. www.bbc.co.uk/mobiletv, is sent from the browser application on the main processor system 300 over the serial interface to the HTTP server 570 running on the mobile TV receiver device 500 (step 604).

The received URL is decoded into an IP address by the HTTP server 570. HTTP server 570 relies on the information stored in the SI/PSI tables by non-protected packet processing unit 560 on the mobile TV receiver device 500 as well as the information decoded and stored by the ESG decoder 552 (step 606).

At step 608, the IP address is accessed from a table in memory 564 that is regularly updated by the SI/PSI processing unit 562 and the ESG decoder 552.

The result of the access is reported in step 610. The result may be a list of packet identifiers (PID's) for the TS packets that contain the desired A/V stream. The list of PIDs for a channel is extracted for the non-protected packets by the SI/PSI processing unit 560.

Once the PIDs for a specific TV channel are known, a search is conducted to determine if the TS packets with that PID are already being received and if they are being corrected into IP datagram, and if they are further processed by the RTP module 542, and sent to the main processor system 300 (step 612) for decode and play back. If so, the channel is displayed using the user interface.

If the desired PID is not being received, the mobile TV receiver device 500 switches to the time slot where the PID is being sent (step 614). The appropriate time slot information is extracted by the SI/PSI processing unit 562.

The RF signal band, digital modulation scheme, signal bandwidth, and error correction method are specific to the standard utilized by the system.

It should be appreciated that components of a mobile terminal may be implemented as hardware, software, or a combination of both. Having thus described at least one illustrative embodiment of the invention, various alterations, modifications, and improvements will readily occur to those skilled in the art. Such alterations, modifications, and improvements are intended to be within the scope of the invention. Accordingly, the foregoing description is by way of example only and is not intended as limiting. The invention is limited only as defined in the following claims and the equivalents thereto.

What is claimed is:

1. A mobile terminal comprising:
   a host device having a media player to receive multimedia streams and present multimedia programs;
   a receiver device, connected to the host device, the receiver device including:
   a receiver front end, having an antenna and a receiver front end output, to receive a radio frequency (RF) signal via the antenna and output a stream of packets from the receiver front end output;
   at least one processing unit to (i) receive internet protocol (IP) packets derived from packets in the stream of packets, (ii) identify IP packets corresponding to the multimedia streams, service information and program specific information (SI/PSI) and electronic service guide (ESG) data, (iii) store a table associating IP addresses with the IP packets corresponding to the multimedia streams based on the SI/PSI and ESG data, and (iv) output the multimedia streams from the processor output; and
   an HTTP server to receive a Uniform Resource Locator (URL) request of selection of a multimedia program from the host device, decode the URL request to an IP address corresponding to a multimedia stream of the requested multimedia program based on the stored table, receive the multimedia stream from the processing unit corresponding to the decoded IP address and transmit the multimedia stream to the host device; and
   an interface to connect the host device and the receiver device.

2. The mobile terminal of claim 1, wherein:
   the processing unit is a protected packet processing unit;
   the protected packet processing unit includes an IP processing unit to identify IP packets corresponding to the multimedia stream;

the packets in the stream of packets are protected packets in the stream of packets; and the receiver device further includes a service information and program specific information (SI/PSI) processing unit to extract SI/PSI tables from non-protected packets in the stream of packets.

3. The mobile terminal of claim 2, wherein the receiver device further includes:
a demultiplexer, including a first output and a second output, the demultiplexer connected to the receiver front end output, to receive the stream of packets, output protected packets from the first output, and output non-protected packets from the second output.

4. The mobile terminal of claim 3 wherein the receiver device further includes:
a correction unit, having an IP packet output and connected to the first output, to perform error correction to protected packets and output IP packets from the IP packet output, each IP packet corresponding to one of the protected packets.

5. The mobile terminal of claim 4 wherein the protected packet processing unit further includes:
a decryption engine to decrypt the multimedia stream from IP packets corresponding to the multimedia stream, based on a decryption key and to output the multimedia stream from the processor output.

6. The mobile terminal of claim 5 wherein:
the RF signal is a first RF signal;
the receiver front end further includes a signal strength output to output signal strength information; and
the receiver device further includes:
a receiver controller connected to the signal strength output and to configure the receiver front end to receive a second RF signal when the signal strength information corresponds to an undesirable state.

7. The mobile terminal of claim 6 wherein the error correction is multiprotocol encapsulation-forward error correction (MPE-FEC).

8. The mobile terminal of claim 6 wherein the IP packets corresponding to the multimedia stream are in real-time transport protocol (RTP).

9. The mobile terminal of claim 6 wherein the interface is a serial interface.

10. The mobile terminal of claim 6 wherein the receiver device further includes:
an electronic service guide (ESG) decoder having an ESG output to output ESG data decrypted from ESG information, the ESG information received from IP packets corresponding to ESG files; and
a service purchase and protection (SPP) unit, connected to the ESG output, to extract the decryption key from the ESG data and provide the decryption key to the decryption engine.

11. The mobile terminal of claim 10 wherein the receiver device further includes:
a session description protocol (SDP) unit to extract media details from IP packets corresponding to SDP files, and output the media details from the processor output.

12. The mobile terminal of claim 11, wherein:
the IP packets corresponding to SDP files are delivered to the SDP unit through a file delivery over unidirectional transport (FLUTE) parser unit and an extensible markup language (XML) parser unit in the protected packet processing unit; and
the IP packets corresponding to ESG files are delivered to the ESG decoder through the FLUTE parser unit and the XML parser unit.

13. The mobile terminal of claim 1, wherein the host device contains a web browser application to receive a user selection of the multimedia program and transmit the user selection as the URL request to the HTTP server via HTTP.

14. The mobile terminal of claim 1, wherein the receiver device is located on a first integrated circuit and the host device includes a processor located on a second integrated circuit, the second integrated circuit being separate from the first integrated circuit.

15. A wireless communications device, comprising:
a processor system; and
a receiver, including:
a front end to receive a radio frequency signal and output a stream of packets derived from the radio frequency signal;
at least one processing unit to: (i) receive internet protocol (IP) packets derived from the stream of packets, (ii) identify those of the IP packets corresponding to multimedia streams, service information and program specific information (SI/PSI) and electronic service guide (ESG) data, (iii) store a table associating IP addresses with the IP packets corresponding to the multimedia streams based on the SI/PSI and ESG data, and (iv) output the multimedia streams; and
a hypertext transfer protocol (HTTP) server to: (i) receive a uniform resource locator (URL) request from the processor system for a selected audio-video program, (ii) decode the URL request to an IP address corresponding to a multimedia stream of the requested multimedia program based on the stored table, (iii) receive the multimedia stream from the at least one processing unit corresponding to the decoded IP address, and (iv) transmit at least a portion of the multimedia stream containing the selected audio-video program to the processor system.

16. The wireless communications device of claim 15, wherein the receiver is connected to the processor system by a serial interface.

17. The wireless communications device of claim 15, wherein the at least one processing unit includes a decryption engine to decrypt the packets corresponding to the selected audio-video program based on a decryption key.

18. The wireless communications device of claim 15, wherein:
the at least one processing unit includes a protected packet processing unit;
the protected packet processing unit further includes an IP processing unit;
the packets corresponding to the selected audio-video program are of a protected packet type; and
the receiver further includes a SI/PSI processing unit to extract the SI/PSI tables from non-protected packets in the stream of packets.

19. The wireless communications device of claim 18, wherein the receiver further includes:
a correction block to perform error correction to the protected packets and to send the protected packets after error correction to the protected packet processing unit;
a demultiplexer to send protected packets to the correction block and non-protected packets to the SI/PSI processing unit; and
a receiver controller to monitor a signal strength of the RF signal and reconfigure the receiver front end based on information in the SI/PSI tables when the signal strength corresponds to an undesirable state.

20. The wireless communications device of claim 18, wherein the processor system further includes a web browser application to receive a user selection of the audio-video program and transmit the user selection as the URL request to the HTTP server via HTTP.

21. The wireless communications device of claim 15, wherein the URL request indicates a selected television channel.

22. The wireless communications device of claim 15, wherein the processor system receives the portion of the multimedia stream from the receiver and presents the selected audio-video program.

23. The wireless communications device of claim 22, wherein the receiver is part of at least one first integrated circuit, a processor of the processor system is part of at least second integrated circuit, and the at least one first and second integrated circuits are separate integrated circuits.

24. A mobile device, comprising:
  a processor system;
  a receiver including:
    a front end to digitize and demodulate a radio frequency (RF) signal and output a stream of packets derived from the digitized and demodulated RF signal;
    a first processing unit having a memory, to receive non-protected packets of the stream of packets, extract tables of service information and program specific information (SI/PSI) from the non-protected packets, and store the extracted tables of SI/PSI in the memory;
    a second processing unit to receive protected packets of the stream of packets, identify electronic service guide (ESG) packets and audio/video packets from the protected packets, extract ESG information and decryption keys from the ESG packets, and decrypt a selected audio/video channel from the audio/video packets using the extracted decryption keys; and
  a hypertext transfer protocol (HTTP) server to receive a uniform resource locator (URL) request for the selected audio/video channel from the processor system, identify packets of the selected audio/video channel using the stored tables of SI/PSI and the extracted ESG information, and transmit identified packets of the selected audio/video channel to the processor system,
  wherein a first integrated circuit having the receiver is separate from a second integrated circuit having a processor of the processor system.

25. The mobile device of claim 24, wherein the URL request indicates a selected television channel.

26. The mobile device of claim 24, wherein the processor system receives the identified packets of the selected audio/video channel from the receiver and generates a display signal of the selected audio/video channel.

27. The mobile device of claim 24, wherein the HTTP server decodes the URL request into an IP address corresponding to the selected audio/video channel.

* * * * *